United States Patent [19]

Ljung et al.

[11] 4,344,706
[45] Aug. 17, 1982

[54] RING LASER GYRO DITHER PULSE ELIMINATOR

[75] Inventors: Bo H. G. Ljung; George F. Schroeder, both of Wayne, N.J.

[73] Assignee: The Singer Company, Little Falls, N.J.

[21] Appl. No.: 168,918

[22] Filed: Jul. 14, 1980

[51] Int. Cl.³ .............................................. G01C 19/64
[52] U.S. Cl. ................................................... 356/350
[58] Field of Search ....................................... 356/350

[56] References Cited

U.S. PATENT DOCUMENTS 4,248,534  2/1981  Elbert .................................. 356/350

*Primary Examiner*—Vincent P. McGraw
*Attorney, Agent, or Firm*—Morris Liss; Thomas W. Kennedy

[57] ABSTRACT

A ring laser gyro is electromechanically oscillated so that oppositely moving light beams in the gyro do not exhibit an undesirable lock-in effect. A piezoelectric transducer mounted in the gyro measures the dither. Analog/digital circuitry converts the measurement to digital dither signals. A non-compensated beam combiner and photodetector assembly are integrally mounted to the gyro for producing beam frequency outputs from the light beams, indicative of inertial rotation of the gyro. The beat frequency outputs and dither signal are input to logic circuitry which eliminates the effect of the dither signal on the beam frequency output signals.

10 Claims, 6 Drawing Figures

RING LASER GYRO DITHER PULSE ELIMINATOR

FIELD OF THE INVENTION

The present invention relates to ring laser gyroscopes (gyros) and more particularly to a digital system for eliminating dither pulses from inertial rotation measurements.

BRIEF DESCRIPTION OF THE PRIOR ART

The prior art discloses a ring laser gyroscope (gyro) such as the type illustrated in FIG. 1A which measures rotation in inertial space. Customarily, such gyros are provided in aircraft and missiles.

Some heat is generated inside such a gyro in order to effect lasing of gases contained within optical resonant cavities, located in the gyro. A beam combiner is positioned adjacent an optical outlet of the gyro, from which rotational data is derived. During warm-up of the gyro, heat is radiated to the beam combiner and thermal expansion of the beam combiner dimensions causes an output even in the absence of a rotation input.

In the prior art configurations, a special offset mounting of the gyro is necessary to permit precise optical alignment of the beam combiner with the optical combiner of the gyro. This offset mounting also causes drift in the output signals of the gyro due to uneven warm-up of the gyro body itself.

In order to achieve the precise optical alignment of the beam combiner with the optical outlet of the gyro, precise location of the beam combiner components is necessary. Further, normally encountered vibration affects this precise optical alignment and measures must be taken to achieve vibration damping.

Inasmuch as the beam collector of the mentioned prior art configuration is positioned at a small distance from the body of the gyro itself, unless the gyro and the beam collector were mounted in a hermetically sealed enclosure of some sort, dust and condensation would effect the optical surfaces between the gyro and the beam collector thereby denigrating gyro performance.

BRIEF DESCRIPTION OF THE PRESENT INVENTION

In the present invention, the beam collector and associated photodetector are integrated into the structure of the gyro. Outputs from the photodetector produce rotational data which is influenced by dither and by inertial rotation. A piezoelectric crystal is mounted within the body of the gyro and converts the dither angle to an electrical signal. Logic circuitry operates upon the dither signal and the output from the beam combiner to subtract the effect of dither. The integral mounting of the beam combiner in cooperation with the mentioned logic circuitry replaces the optical compensating beam combiner of the prior art. Further, the integral mounting of the beam combiner of the present invention eliminates the need for offset mounting of the gyro as was the case with the prior art. This eliminates drift due to uneven warm-up of the gyro and also eliminates drift due to warm-up of the beam combiner. Therefore, there is the added advantage that the beam combiner need not be mounted with low expansion material. A further advantage when compared to the prior art is that the present invention makes vibration damping of the beam combiner mounting structure unnecessary. Inasmuch as the beam combiner and photodetector are integrally mounted with the gyro, it is no longer necessary to include these latter components in a hermetically sealed box with the gyro and by employing the present invention, a ring laser gyro can be reduced in size and cost while an increase in performance may be realized.

The above-mentioned objects and advantages of the present invention will be more clearly understood when considered in conjunction with the accompanying drawings, in which:

DETAILED DESCRIPTION OF THE INVENTION

Figure 1A:
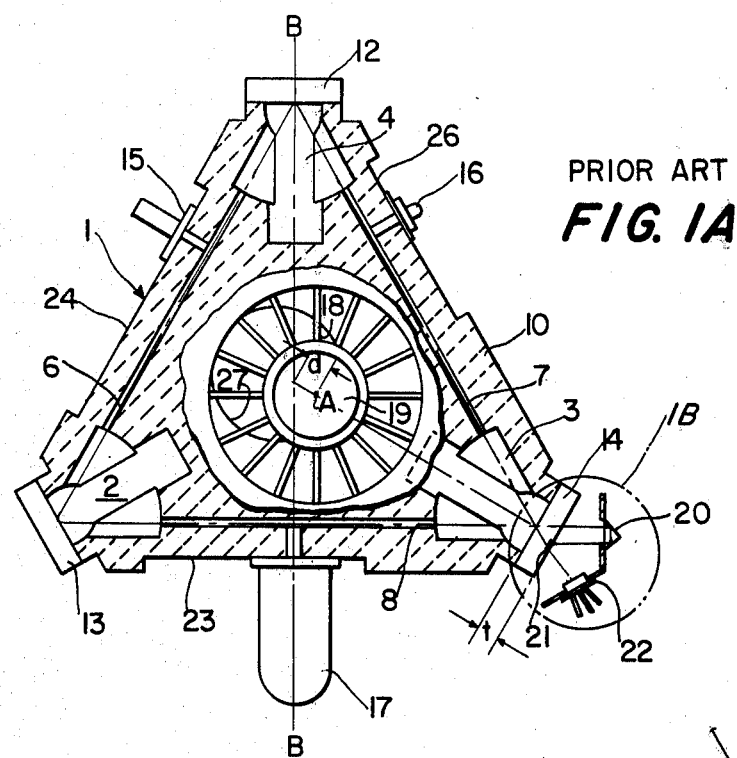
FIG. 1A is a sectional view of a prior art ring laser gyro.

In order to form a basis for the discussion of the present invention, reference is made to FIG. 1A which illustrates a prior art ring laser gyroscope (gyro) generally indicated by reference numeral 1. The gyro has a triangularly shaped glass-ceramic body 10. Tubular cavity sections 6, 7 and 8 form triangular sections which contain a gas mixture such as helium and neon. Larger cavities 2, 3 and 4 interconnect the triangular sections to form a continuous cavity. A mirror 12 of high reflectivity encloses the upper corner of the gyro while a similar mirror 13 encloses the lower left corner. An output mirror 14 encloses the lower right corner of the gyro. A half-silvered mirror 21 characterizes a portion of the output mirror 14. The mirror combination 14, 21 reflects light impinging upon it as well as permits the passage of light outwardly from the lower right end of the gyro.

A first anode 15 is mounted in the body 10 of the gyro and has access to the cavity section 6. A second anode 16 is similarly mounted to the body 10 of the gyro. A cathode 17 is mounted to the lower edge of the triangular glass-ceramic gyro body 10 and there is access between the cathode and the corresponding cavity section 8. Upon electrical energization of the anode and cathode electrodes, lasing of the helium neon gas mixture occurs wherein clockwise (CW) and counterclockwise (CCW) beams occur within the interconnected cavity sections 6, 7 and 8. Radial torsion springs 18 are mounted between a support post 19 and the body 10 of the gyro. Due to normal irregularities on the surface of the mirrors 12, 13 and 14, a beam impinging upon a particular mirror will not be perfectly reflected to an adjacent cavity section. Rather, some back scattering occurs. This causes the beat frequency between the two beams to disappear at low inertial rotation input rates. This is referred to as the lock-in effect, which has been recognized for some time in the prior art. This has been solved by driving the gyro body 10 in rotational oscillation (dither). The means for accomplishing the dither conventionally include a piezoelectric actuator (not shown) connected to the spring 18 and causing the body 10 to oscillate angularly at its natural mechanical resonance frequency.

Figure 1B:
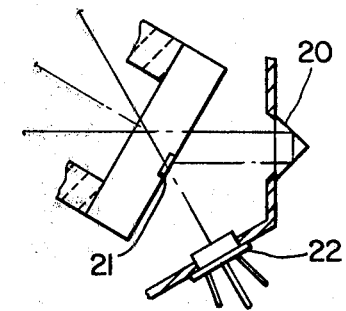
FIG. 1B is an enlarged partial sectional view of one corner of the prior art gyro disposed adjacent to a compensating beam combiner.

The dither is superimposed upon the actual rotation of the gyro in inertial space. Accordingly, it is necessary to recover inertial rotation data free from dither. Precise recovery of the actual data has been previously accomplished by using a compensating beam combiner. This beam combiner consists of a corner cube retroreflector 20, shown enlarged in FIG. 1B. The CW and CCW laser beams are combined at the half-silvered mirror 21. Heterodyning or mixing of the CW and CCW beams is detected by means of a dual photodetector 22 mounted to a bracket which is customarily fixed to a housing which encloses the combiner and the gyro in a hermetically sealed case (not shown). With this implementation of components, an interferometer is formed for the CW and CCW beams. Simply stated, an interferometer is any arrangement whereby a beam of light is separated into two or more parts by partial transmission or reflection, the parts being subsequently reunited after traversing different optical paths. The sensitivity of the interferometer formed is equal and opposite to that of the ring laser gyro output when the gyro is dithered about Point A, on the axis of post 19. In order to achieve the necessary precise alignment of the beam combiner with the output mirror 14, an offset "d" is made to exist between the axis Point A and the geometric center of the gyro body 10. The offset "d" is made to equal the thickness "t" of the mirror 14.

The prior art teaches combining the CW and CCW beams so that a small angle of convergence is formed between the two beams as they reach the photodetector 22. By so doing, an interference pattern is formed that consists of bright areas interspaced by dark areas. The bar-shaped interference pattern moves to either side, depending on the direction the ring laser gyro 1 is rotated. The sense of rotation of the gyro can thus be detected by dividing the photodetector into two areas, spaced one-fourth the distance between the bright areas in the bar-shaped pattern. The performance of the gyro is extremely sensitive to the mechanical stability of the compensating beam combiner with respect to the mirror 21. As previously mentioned, the sensitivity manifests itself in drift of the true inertial rotation data output signal due to uneven warm-up of the beam combiner. This problem normally requires not only extremely accurate positioning of the beam combiner, relative to mirror 14, but also requires the use of low expansion material in the beam combiner.

Assymetrical cutouts 23, 24 and 26, together with offset opening 27 formed in the body 10, are used to mechanically balance the body 10 around its support post 19. This balancing is necessary in order to avoid mechanical coupling to external sources of linear vibration.

A major problem with the prior art ring laser gyro of FIG. 1A resides in the extreme sensitivity to temperature gradients across the symmetry axis B-B of the gyro body 10. These gradients change the flow of gas in the gyro cavity which results in output pulses from the gyro at the times when no actual rotation in inertial space is being experienced by the gyro. Instability results when there is a change in the external temperature.

The reason for this is that the asymmetrical block induces asymmetrical temperature gradients with resulting asymmetrical mechanical changes. The thermal time constants involved are in the order of hours.

Figure 5:
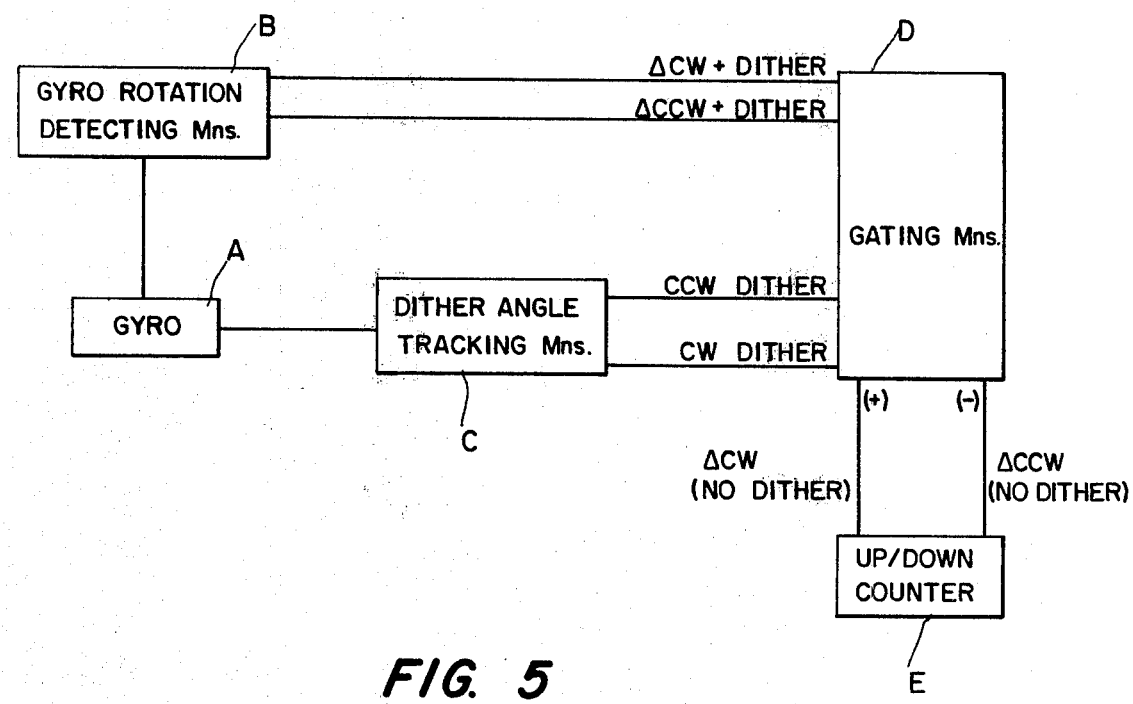
FIG. 5 is a basic block diagram of the present invention.

A basic block diagram of the present invention is illustrated in FIG. 5. A ring laser gyro A is provided with a gyro rotation detecting means B which provides two electrical output signals respectively carrying clockwise and counterclockwise gyro rotation information. However, each of the signals has a dither component added to the true gyro inertial rotation. In order for the dither components to be eliminated, the gyro is provided with dither angle tracking means C which picks up only clockwise and counterclockwise dither components of gyro rotation. Gating means D operates upon all four signals mentioned. An up/down counter E has two inputs connected to it from the gating means D. The dither component in the clockwise direction will add to the count of the counter E while the dither component in the counterclockwise direction will subtract from the count in counter E (or vice versa). The result over a period of time will be a cancellation of the clockwise and counterclockwise dither components so that an accumulated count is directly proportional to the true inertial rotation of the gyro.

Figure 2:
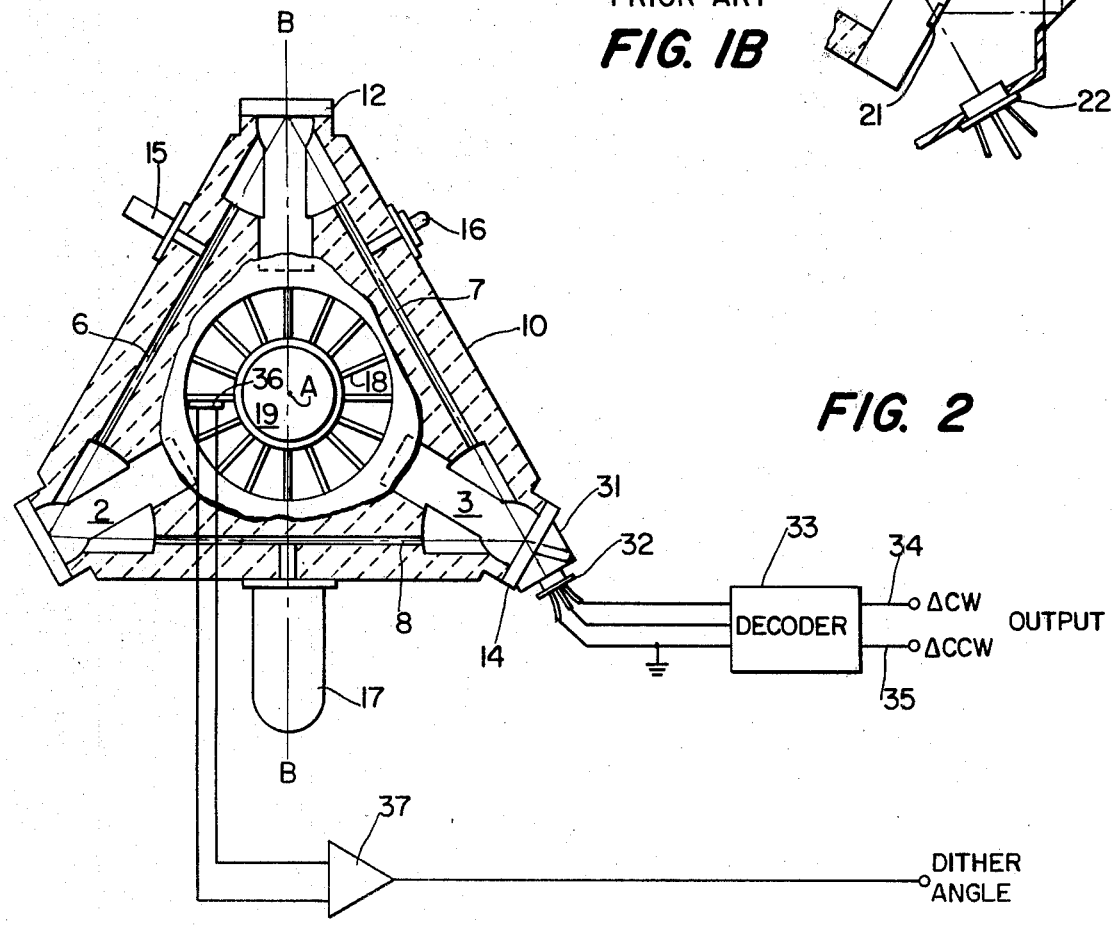
FIG. 2 is a sectional view of a ring laser gyro adapted with a dither angle pick-up and non-compensating beam combiner, both coupled to a first portion of electronics used in conjunction with the invention.

FIG. 2 illustrates the inventive ring laser gyroscope fitted with an integral, non-compensating beam combiner 31. This beam combiner directs the CW and CCW beams onto a dual photodetector 32. The output from the dual photodetector is decoded in a conventional logic decoder 33 to output either a pulse on the CW output line 34 ($\Delta$CW) or a pulse on the CCW output line 35 ($\Delta$CCW). A piezoelectric crystal 36 is attached to one of the radial arms of the spring 18. The mechanical oscillation, constituting dither, is detected by crystal 36 and fed along leads to amplifier 37, the output of which is the dither angle signal.

As will be observed from FIG. 2, the axis Point A of the support post 19 is coincident with the symmetry axis B—B and indeed the geometric center of body 10 of the gyro. For purposes of convenience, similar components in the gyros of FIG. 1A and 2 are indicated by the same numerals.

It will be observed that the cutouts 23, 24 and 26 shown in FIG. 1A are not necessary in the inventive embodiment of the ring laser gyro shown in FIG. 2.

Further, it will be observed that the offset opening 27, shown in FIG. 1A, is not shown in the gyro of FIG. 2. By eliminating these structural features from the gyro of FIG. 1A, manufacturing costs are lower.

Figure 3:
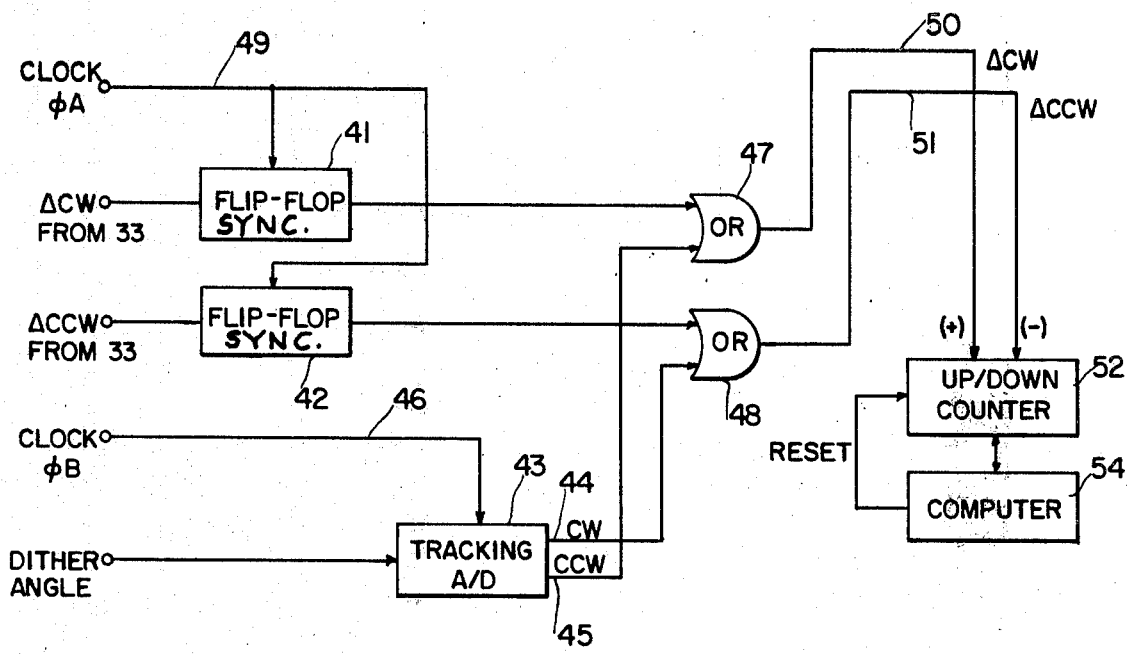
FIG. 3 is a schematic diagram of the electronics utilized to eliminate a dither signal from the output of the gyro of FIG. 2.

FIG. 3 illustrates the schematic representation of a circuit which eliminates the effect of dither from the gyro of FIG. 2. The $\Delta$CW and $\Delta$CCW output signals indicated in FIG. 2 are fed to two flip-flop synchronizers 41 and 42. A clock signal along lead 49, characterized by a first phase A, controls the flip-flops so that an input pulse to the flip-flops becomes synchronized with the clock signal.

The dither angle signal shown in FIG. 2 is converted to a digital signal in a tracking analog/digital converter 43 shown in FIG. 3. The circuitry of this converter will be discussed in greater detail hereinafter, in connection with FIG. 4. The converter 43 outputs pulses on output leads 44 and 45 in response to the dither angle signal at its input, even during the absence of actual inertial rotation. A clock signal is provided to the converter 43 along lead 46 so that the outputs on either CW lead 44 or CCW lead 45 are synchronized to the clock signal input lead 46. The latter-mentioned clock operates in a second phase B. The two clock frequencies on leads 46 and 49 are identical in frequency. However, the phase difference is nominally 180 degrees. This assures that there will be no conflict at the "OR" gates 47 and 48, the latter gates respectively connected at first inputs thereof to flip-flops 41 and 42 while respective second inputs to the gates are connected to CW lead 44 and CCW lead 45. Freedom from such conflict permits pulse streams to be generated along gate output leads 50 and 51. The outputs from the flip-flop synchronizers 41 and 42 are, together with the output from the analog/digital converter output leads 44 and 45, fed to the "OR" gates 47 and 48, in such a way that their sum at the output of the gates will cancel the effect of the dither motion. To accomplish this, the two output leads 50 and 51 respectively carry count up (+) and count down (−) pulses so that opposing dither pulses will be canceled by the up/down counter 52 and therefore the dither angle output will be eliminated. Accordingly, any pulse count accumulated by counter 52 represents the true inertial rotation output of the gyro. The inertial rotation output from the counter 52 is customarily utilized by a computer 54 connected to the output of the counter 52, the computer, per se, is not an essential part of the present invention. After an accumulated count is sampled by the computer 54, a reset pulse is furnished to the counter 52 so that it may be cleared.

Figure 4:
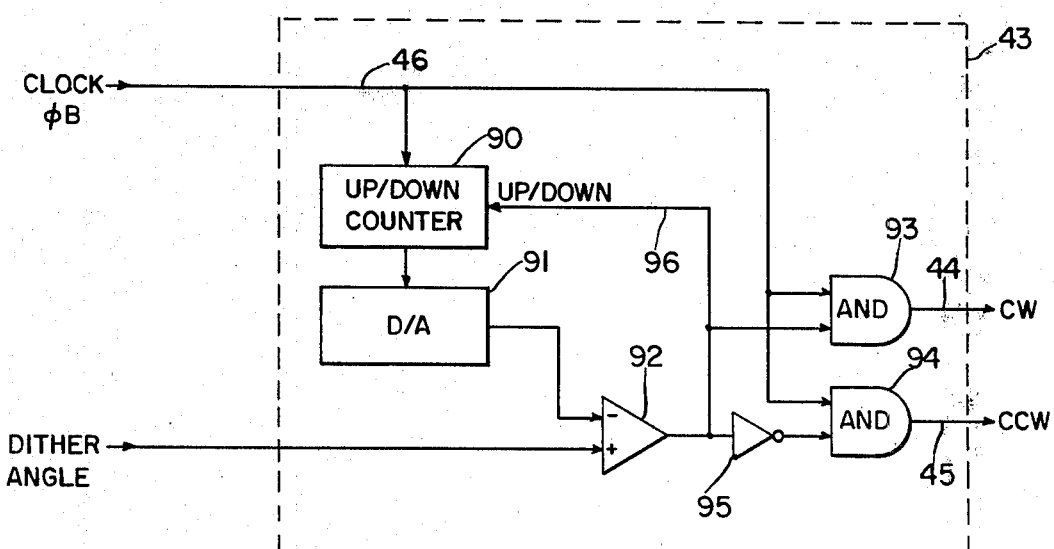
FIG. 4 is a detailed schematic diagram of the tracking analog/digital converter utilized in connection with FIG. 3.

FIG. 4 shows a detailed schematic diagram of the tracking analog/digital converter 43, previously discussed in connection with FIG. 3. The phase B clock signal along lead 46 synchronizes up-down counter 90. The digital output from the counter 90 is a parallel output and is converted to an analog signal after processing by a conventional digital/analog converter 91. The output from the converter 91 is compared to the analog dither angle signal produced by amplifier 37 (FIG. 2). The comparison takes place in a conventional comparator 92. The output of comparator 92 is connected as a second input 96 to counter 90. The output of comparator 92 is either high or low, forcing counter 90 either to increase its count or decrease its count. The counter is in this way forced to track the dither angle. A first AND gate 93 has its first input connected to the clock signal lead 46 while a second input to the gate is connected to the output of comparator 92. A second AND gate 94 is also connected to the clock lead 46 while a second input to this gate is connected to the output of comparator 92, via inverter 95. By combining the output of comparator 92 with the state of the clock signal in both AND gates 93 and 94, the outputs CW and CCW of converter 43 are generated. By proper scaling, these outputs are made to look identical to the output lines 34 and 35 (FIG. 2), in the absence of an inertial rotation experienced by the gyro.

From the description of the present invention as furnished hereinabove, it will be appreciated that the effect of the dither output from a ring laser gyro has been canceled.

It should be understood that the invention is not limited to the exact details of construction shown and described herein for obvious modifications will occur to persons skilled in the art.

We claim:

1. In a dithering ring laser gyro, a system for producing inertial rotation data free of dither, the system comprising:

detecting means for detecting gyro rotation in the clockwise and counterclockwise directions, the rotation including dither components;

means connected to the gyro for tracking the clockwise and counterclockwise components of dither alone;

gating means connected at its input to the outputs from the detecting means and the tracking means for generating first and second signals;

counter means having a count increasing input driven by the first signal and a count decreasing input driven by the second signal for eliminating the effect of dither and accumulating a count corresponding to true inertial gyro rotation data.

2. The subject matter of claim 1 wherein the detecting means comprises:

a beam combiner integrally mounted to an optical outlet of the gyro;

means responding to an optical input from the beam combiner and producing electrical signals at its output, corresponding to the clockwise and counterclockwise rotation including dither components.

3. The subject matter of claim 1 wherein the tracking means comprises:

means mounted to the gyro for generating an analog signal corresponding to dither angle experienced by the gyro; and means for converting the analog signal to first and second digital signals corresponding to clockwise and counterclockwise dither components.

4. The subject matter set forth in claim 2 together with means for synchronizing the electrical signals from the responding means with a clock signal.

5. The subject matter set forth in claim 3 together with means for synchronizing the converting means with a clock signal.

6. In a dithering ring laser gyro, a system for producing inertial rotation data free of dither, the system comprising:

detecting means for detecting gyro rotation in the clockwise and counterclockwise directions, the rotation including dither components, the detecting means including
   (a) a beam combiner integrally mounted to an optical outlet of the gyro;
   (b) means responding to an optical input from the beam combiner and producing electrical signals at its output, corresponding to the clockwise and counterclockwise rotation including dither components;
   (c) means for synchronizing the electrical signals to a first clock signal;

means connected to the gyro for tracking the clockwise and counterclockwise components of dither alone, the tracking means including:
   (a) means mounted to the gyro for generating an analog signal corresponding to the dither angle experienced by the gyro;
   (b) means for converting the analog signal to first and second digital signals corresponding to clockwise and counterclockwise dither components; and
   (c) means for synchronizing the converting means to a second clock signal having the same frequency as the first clock signal but shifted in phase by 180 degrees.

7. The subject matter set forth in claim 6 together with gating means connected at four inputs thereof to:

(a) the clockwise signal from the responding means and the counterclockwise dither component signal; and (b) the counterclockwise signal from the responding means and the clockwise dither component signal; the output of the gating means furnishing the first and second signals to an up/down counter which accumulates a count indicative of inertial rotation data, free of dither.

8. The subject matter set forth in claim 7 wherein the converting means comprises:

a second up/down counter having a count incrementing input, the counter having an output for driving a digital/analog converter;

a comparator having a first input connected to an output of the converter and a second input connected to the dither angle analog generating means; and means connecting the output of the comparator to the count incrementing input of the up/down counter.

9. The subject matter set forth in claim 8 together with an inverter connected at its input to the output of the comparator, and gating means, synchronized to the second clock signal, connected at its input to outputs of the inverter and the comparator, the output of the gating means producing the clockwise and counterclockwise dither components.

10. The subject matter set forth in claim 9 wherein the synchronized gating means comprises first and second AND gates having first inputs thereof connected to the second clock signal, the second inputs of the AND gates being respectively connected to the comparator and the inverter.

* * * * *